UNITED STATES PATENT OFFICE.

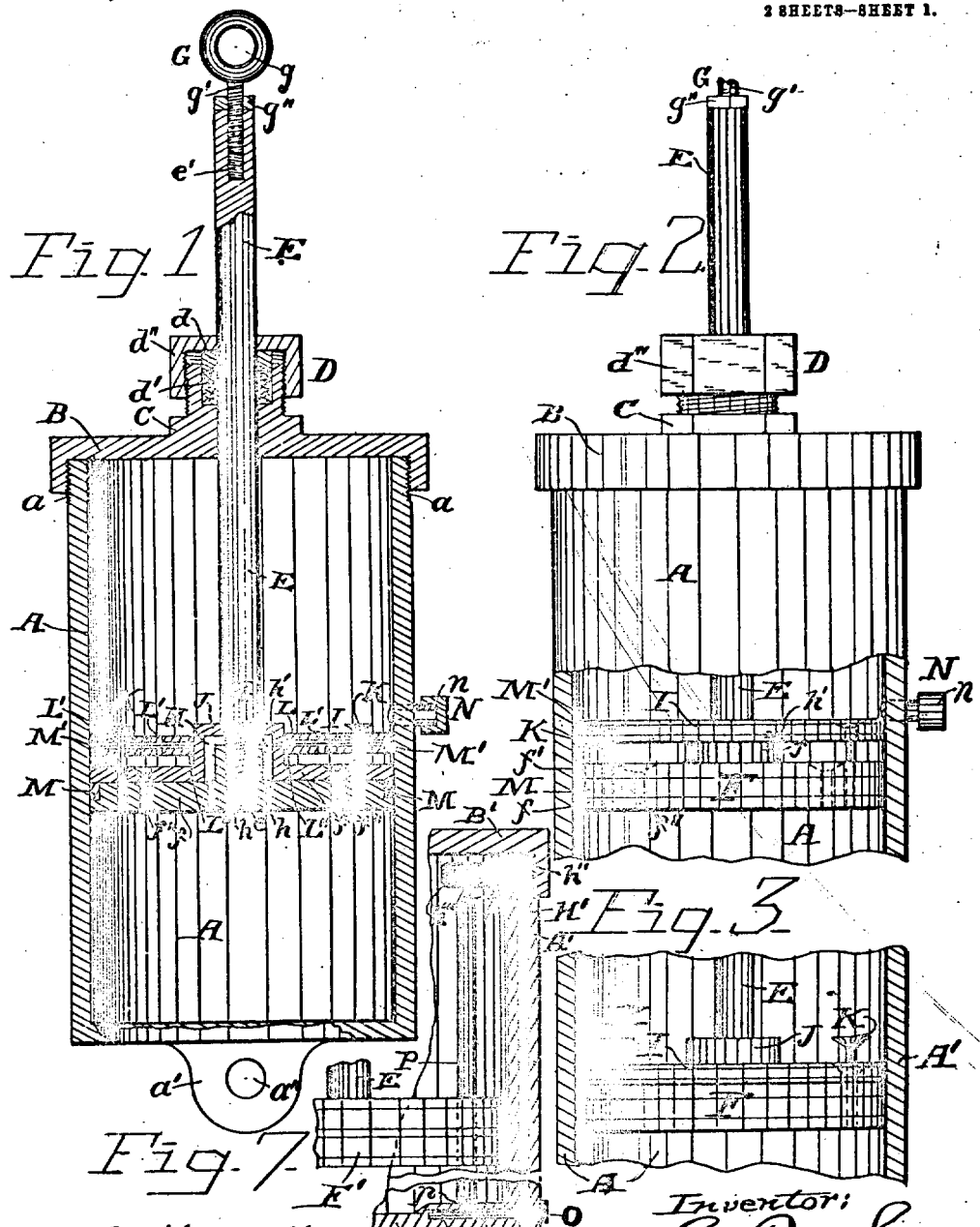

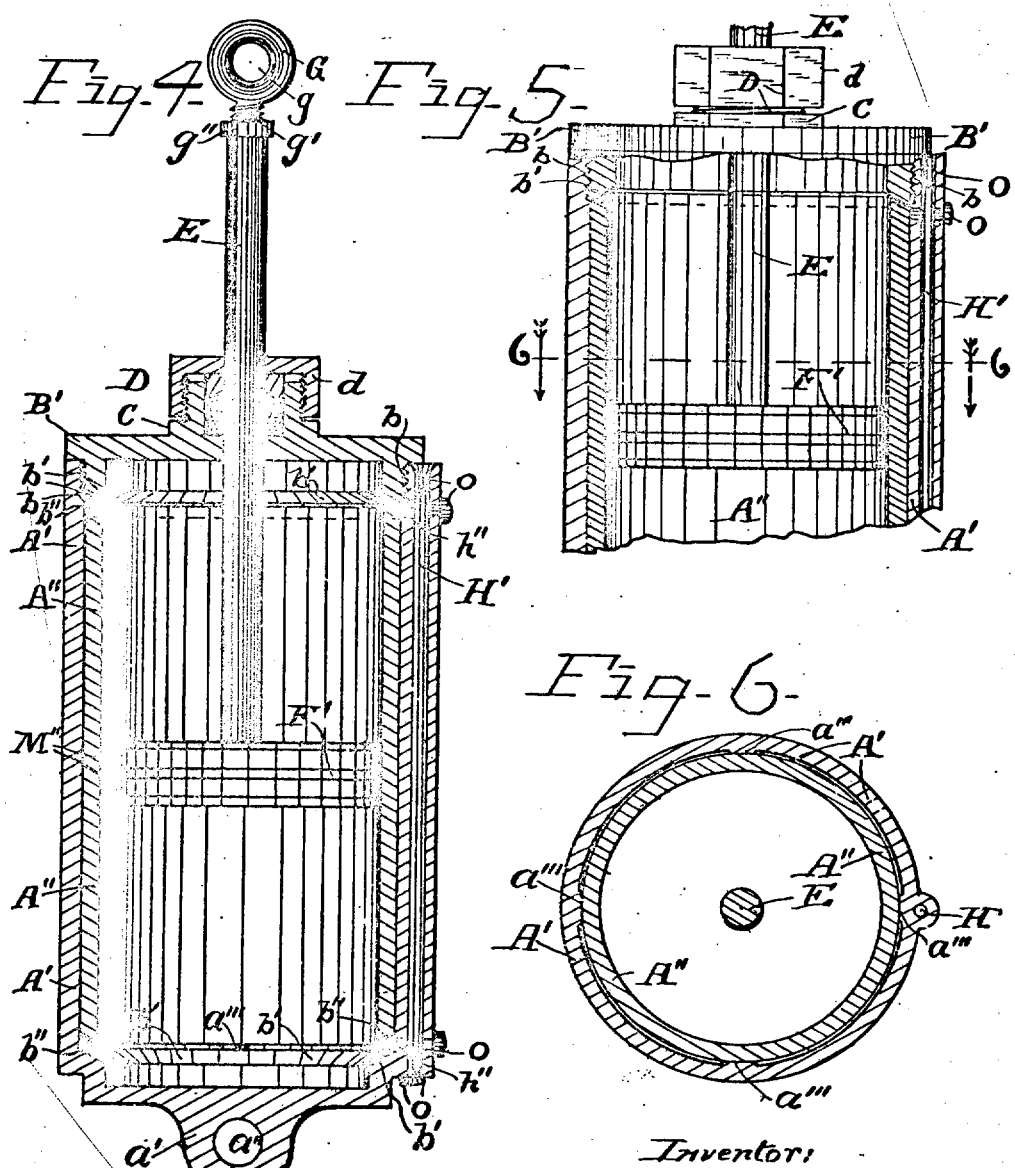

JOHN C. BECK, OF SYCAMORE, ILLINOIS, ASSIGNOR OF ONE-HALF TO CHARLES TURNER BROWN, OF CHICAGO, ILLINOIS.

SHOCK-ABSORBER.

No. 899,001.　　　　　Specification of Letters Patent.　　　Patented Sept. 15, 1908.

Application filed October 17, 1907. Serial No. 397,772.

*To all whom it may concern:*

Be it known that I, JOHN C. BECK, a citizen of the United States, and a resident of Sycamore, in the county of Dekalb and State of Illinois, have invented certain new and useful Improvements in Shock-Absorbers, of which the following, when taken in connection with the drawings accompanying and forming a part hereof, is a full and complete description, sufficient to enable those skilled in the art to which it pertains to understand, make, and use the same.

This invention relates to devices principally used on automobiles to lessen the shock occasioned by the vehicle moving over an uneven road or over obstacles in a road, such devices being known to the art as shock absorbers.

The object of this invention is to obtain a shock absorber which will not restrict the resiliency of the springs of the automobile to which the device is attached and which can be easily adjusted when used on automobiles of varying weight.

A further object of the invention is to obtain a shock absorber which will be effective in operation, simple in construction and not liable to get out of order.

In the drawing referred to Figure 1 is a vertical sectional view of a shock absorber embodying this invention. Fig. 2 is an elevation of a portion of a shock absorber with a portion of the cylindrical wall thereof broken away to expose to view the movable parts of the device, which are shown in elevation. Fig. 3 is a vertical sectional view of a portion of the cylindrical wall of the device, showing the movable parts thereof in elevation. Fig. 4 is a vertical section of a modification of the apparatus. Fig. 5 is a vertical section of a portion of the cylindrical wall of the modification, and Fig. 6 is a horizontal section on line 6—6 of Fig. 5, viewed in the direction indicated by the arrows. Fig. 7 is an additional modification, shown in section.

A reference letter applied to designate a given part is used to indicate such part throughout the several figures of the drawings wherever the same appears.

A is a cylindrical casing.

B is the removable end of casing A and is attached to such casing by means of internal screw threads corresponding with and fitting over the screw threads $a$, (see Fig. 1).

$a'$ is a lug on the bottom of casing A such lug being provided with hole $a''$ through which a bolt secured in a suitable collar or bracket on the axle of a vehicle may be passed.

The end B is provided with the hexagonal portion C to which a wrench may be fitted to turn such end firmly to its place. The end B is also provided with the stuffing box D having the gland $d$ and packing $d'$. $d''$ is the hexagonal end of the stuffing box D.

E is a longitudinally movable stem provided at its lower end with the piston F and at its upper end with the adjustable eye bolt G. Eye bolt G is provided with aperture $g$ through which a bolt secured in a suitable bracket on the body of a vehicle may be passed. The eye bolt G is provided with screw threads $g'$ fitting into corresponding screw threads $e'$ in stem E to permit a variation in length of stem E, to the end that the piston F may be substantially midway between the ends of the cylinder when the automobile is not moving. The adjustment of the eye bolt G may be such that the piston F will stand substantially midway between the ends of the cylinder A when the automobile is not in motion with a given load in the automobile, or without a load, as preferred.

$g''$ is a lock nut by means of which the adjustment of the eye bolt G is maintained.

The piston F is provided with the annular chamber H and the vertical passage ways $h$, $h$, communicating with the portion of the cylinder below the piston and with such annular chamber. Such piston is also provided with the passage way $h'$ communicating, when open, with the portion of the cylinder A above the piston F.

I is a disk movably mounted on part J of the piston F. The movement of the disk I is limited by screws or bolts K, such bolts being secured in the piston F and such disk being provided with holes in which such bolts loosely fit. The disk I is also provided with passage ways L, L' and L'' therein.

L'' is annular, L' is vertical and L is horizontal. When the disk L is in the position illustrated in Fig. 1 of the drawings, air or other gaseous matter may pass freely from one end of the cylinder A to the other end thereof through passage ways $h$, L, L', L'', $h'$, and the annular chamber H. When the disk L is in the position illustrated in Figs. 2 and 3 of the drawings, respectively, the passage way $h'$ is closed by such disk and air cannot flow from one end of the cylinder A to the other end thereof. When the stem E and the piston F are moving down the disk I is in substantially the position illustrated in Fig. 2 of the drawings and when such stem and piston are moving upwardly the disk I is in substantially the position illustrated in Fig. 3 of the drawings, (relative to the piston F). When the direction of motion of the stem E and piston F changes and the disk I changes from the position shown in one of the Figs. 2 and 3 to the other of the positions shown in such figures, such disk moves on part J of the piston over or through the position thereof illustrated in Fig. 1 of the drawings, and at such time, and at no other time, communication is effected between the ends of the cylinder A.

M is a spring ring on piston F and M' is a spring ring on disk I. I have constructed the piston F of two parts $f$ and $f'$, attached together by the screws $f''$. The part $f$ is provided with a hub, in which hub the stem E is secured, as by the screw threads $e$ on such stem fitting into corresponding screw threads in such hub, (see Fig. 1). The movable parts of the device may be oiled by oil introduced through oil cup N. To introduce such oil the cover $n$ is removed.

In the modification illustrated in Figs. 4, 5 and 6 the cylinder A' and end B' form the casing of the device. Cylinder A' is provided with internal screw threads and end B' is provided with corresponding external threads. A'' is a longitudinally movable cylinder, open at its ends, contained within the cylinder A'. $b'$, $b'$, are seats provided for the ends of the cylinder A''. One of the seats $b'$ is on the end B' and the other is adjacent to the bottom of cylinder A'. $h''$, $h''$, are passage ways near the ends of the cylinder A', communicating respectively with the passage way H'. Passage ways $h''$, $h''$ are alternately closed upon a change of movement of the piston F', at whatever position or place in such cylinder such piston is at the time of the change in motion, by the cylinder A'' being seated, by the ends $b''$ coming into contact with the seats $b'$, $b'$. In this modification the distance the cylinder A'' may move is about three times the diameter of one of the passage ways $h''$. To insure easy longitudinal movement of the cylinder A'' I provide ribs $a'''$, $a'''$, on the inside of cylinder A', (see Figs. 4 and 6). Passage ways H', $h''$, $h''$ are closed by the plugs O, O.

In the modification illustrated in Fig. 7 the cylindrical casing A' is retained, provided with the passage ways H', $h''$, $h''$, stem E and piston F' and cover B' are also retained. The passage ways $h''$, $h''$ are continued beyond the inner walls of the cylinder, and are closed at their respective ends. The passage ways $h''$, $h''$ are also in this construction provided with the conical recessed openings $p$, $p$, which are alternately closed by the rod P, which is carried by the piston F'. The ends of the rod P are cone shaped, to fit closely in the recesses $p$, $p$ to insure closing of the same. A close but sliding fit of the rod P is made in the piston F', so that as soon as the change of direction of movement of the piston is made, in the operation of the device, and the passage way $h''$ at one end of cylinder A' has, (by such change of movement) been opened and the passage way $h''$ at the other end has been closed, continued movement of the piston will not cause further movement of the rod P.

In the modification illustrated in Figs. 4, 5, 6 and 7 the plugs O, O, or any one thereof, may be omitted in which case atmospheric pressure of air will at all times exist, (or nearly so) behind the piston, and upon change of direction of movement of such piston such air will be held and put under compression by the returning piston.

In all the constructions shown the piston is moved a greater or less distance in the cylinder by the oscillation or play of the springs of the vehicle being greater or less according to the character of the road way over which the vehicle is moving; and in all the constructions whenever the change of movement of the piston is effected, at such time communication is effected between the chambers in front and in rear of the piston, and immediately thereafter such communication is closed, to remain closed so long as the piston continues to move in such given direction.

The operation of this apparatus is,— When, by a movement of the piston in a given direction the communication between the ends of the cylinder is closed, the air in front of the piston is compressed until the movement of the piston ceases. When such piston begins to move in the opposite direction, (because of the resiliency of the springs of the vehicle and the greater pressure on the forward side of the piston) the passage way from end to end of the cylinder is closed, until the direction of movement of such piston is again reversed.

In the construction illustrated in Figs 1, 2 and 3 the passage way from one end of the cylinder is through the piston, and the closing thereof is effected by the disk I not following the reverse movement of the piston until the relative position of such disk and piston changes, as hereinbefore described, and by such change of relative position the passage way $h'$ is opened and again closed by such disk.

In the modifications illustrated in Figs. 4, 5, 6 and 7, the passage way from one end of the cylinder to the other is around the piston, (in the casing), and the closing thereof is effected by the piston, immediately upon the movement thereof being reversed, carrying the closing device, (cylinder A" in Figs. 4, 5 and 6, and rod P in Fig. 7) therewith to close the opening to such passage way at the end towards which the piston is moving; and such piston, thereafter continuing its movement to compress the air thus held in the cylinder in front of the piston, is stopped at the end of its movement by the air so compressed by it.

Having thus described my invention, what I claim is new and desire to secure by Letters Patent of the United States is,—

1. The combination of a casing provided with a cylindrical chamber, a piston in the chamber, a stem to the piston, such stem extending through one of the end walls of the cylindrical chamber, means to adjust the length of the piston stem and to maintain it at an adjusted length, a passage way through the piston, a disk on the piston, such disk movable relative to the piston, and such disk provided with a passage way therethrough, and such disk and piston arranged so that upon a change of direction of movement of the piston a corresponding change in relative position of the disk and piston will be effected and the passage way through the piston will thereby be opened and again closed; substantially as described.

2. The combination of a casing provided with a cylindrical chamber, a piston in the chamber, a stem to the piston, such stem extending through one of the end walls of the cylindrical chamber, means to vary the length of the stem and to maintain it at a determined length, a passage way one end whereof opens into the cylindrical chamber on one side of the piston and the other end whereof opens into such chamber on the other side of the piston, means actuated by the piston at the beginning of the movement of such piston in a given direction to open the passage way and to again close such passage way by the continuation of such movement of the piston; substantially as described.

3. The combination of a cylinder provided with an end integral therewith and with screw threads adjacent to the open edge thereof, a removable end to the cylinder provided with screw threads corresponding with the screw threads on the cylinder, a stuffing box on such end, a piston arranged to obtain chambers in the cylinder, a piston stem extending through the stuffing box, such chambers provided with a communicating passage way, means to open such passage way on the change of movement of the piston from one direction to the opposite direction and to close such passage way on the continued movement of the piston.

4. The combination of a cylinder closed at its ends a piston arranged to obtain a chamber on each side thereof within such cylinder, a stem to the piston, such stem extending through one of the ends of the cylinder, such chambers provided with a passage way by means of which communication may be effected between the chambers, means to open such passage way on the change of movement of the piston from one direction to the opposite direction and to close such passage way on the continued movement of the piston in the new direction, a stuffing box to the stem and means to vary the length of the stem and to maintain it at a determined length; substantially as described.

5. The combination of a cylinder closed at its ends, a piston arranged to obtain a chamber on each side thereof within such cylinder, a stem to the piston, such stem extending through one of the ends of the cylinder, such chambers provided with a communicating passage way, means to open such passage way on the change of movement of the piston from one direction to the opposite direction and to close such passage way on the continued movement of the piston.

JOHN C. BECK.

In presence of—
ALEXANDER RAFFEN
JOHN A. BOWYER.